United States Patent
Dixon

(10) Patent No.: US 6,598,914 B1
(45) Date of Patent: Jul. 29, 2003

(54) AERODYNAMIC STORAGE BUMPER

(76) Inventor: Jere Dixon, 6981 Tradewind Way, Lantana, FL (US) 33462

( * ) Notice: Subject to any disclaimer, the term of this patent is extended or adjusted under 35 U.S.C. 154(b) by 0 days.

(21) Appl. No.: 10/251,127

(22) Filed: Sep. 19, 2002

(51) Int. Cl.[7] .......................... B60R 19/20; B60R 16/08; B60R 9/06
(52) U.S. Cl. ...................... 293/106; 293/117; 296/37.6; 296/180.1
(58) Field of Search ................................. 293/106, 102, 293/117; 296/37.1, 37.6, 180.1; 224/488–491

(56) References Cited

U.S. PATENT DOCUMENTS

| | | | |
|---|---|---|---|
| 2,993,721 A | * 7/1961 | Bowman | 293/106 |
| 3,614,136 A | 10/1971 | Dent | |
| 4,176,858 A | * 12/1979 | Kornhauser | 280/734 |
| 4,487,446 A | * 12/1984 | Reich, II | 293/106 |
| 4,570,986 A | 2/1986 | Sams | |
| 4,674,782 A | 6/1987 | Helber | |
| 4,756,457 A | 7/1988 | Polk | |
| 4,901,895 A | 2/1990 | Gancarz | |
| 4,902,059 A | * 2/1990 | Tritton | 293/117 |
| 5,016,932 A | 5/1991 | Carter | |
| 5,364,142 A | 11/1994 | Coiner | |
| 5,460,420 A | * 10/1995 | Perkins et al. | 293/106 |
| 5,725,265 A | * 3/1998 | Baber | 293/107 |
| 5,823,585 A | 10/1998 | Tanguay | |
| 5,918,663 A | * 7/1999 | Hoglinger et al. | 293/117 |
| 6,217,090 B1 | * 4/2001 | Berzinji | 293/132 |
| 6,318,774 B1 | * 11/2001 | Karr et al. | 293/117 |
| 6,450,556 B1 | * 9/2002 | Jacobs | 293/107 |

* cited by examiner

Primary Examiner—D. Glenn Dayoan
Assistant Examiner—Greg Blankenship
(74) Attorney, Agent, or Firm—McHale & Slavin, P.A.

(57) ABSTRACT

An aerodynamic front bumper storage assembly for use with trucks, sports utility vehicles and recreational vehicles which can be adapted for specific recreational use. The bumper storage assembly includes a bumper shell secured to the frame of the vehicle. The bumper shell is constructed from molded plastic which has a top surface, a front surface, a rear surface, a bottom surface, and opposing left and right surfaces which define an interior cavity. The rear surface is configured to be coextensive with the front end engine components of the vehicle. The bumper shell includes a center storage compartment and left and right side compartments which are molded into the bumper shell. The storage compartments are defined by bottom walls supported by four side walls and are respectively accessible from the top surface through center, left and right apertures disposed in the top surface. The center aperture and left and right side apertures each have lids hingedly attached to one of the side edges of the apertures. The lids have a front edge and a rear edge each having a length, wherein the length of the rear edge is greater than the length of the front edge forming an air foil shape which forces the lids into a closed position over the apertures when the vehicle is moving.

17 Claims, 13 Drawing Sheets

AERODYNAMIC STORAGE BUMPER

FIELD OF THE INVENTION

This invention is related to the front bumpers of vehicles, and more particularly to a front bumper assembly for a truck, recreational vehicle or sports utility vehicle which has multiple functions to extend the versatility of the vehicle.

BACKGROUND OF THE INVENTION

Trucks and sports utility vehicles (SUVs) are recognized for their ability to haul items typically not possible in conventional passenger vehicles. Open bed pick-up trucks present a unique problem in that the primary function is for carrying of large loads which causes a reduction or elimination of storage space for smaller items, especially those that must be kept out of the elements. For example, if the passenger compartment of a pick-up truck is filled with occupants, there is limited room for items that must be kept out the elements such as food, tools, soda pop, and so forth. Leaving a power tool such as an electric drill in the back of the pick-up exposes the power tool to the elements wherein the sun and or rain can damage the tool as well as leaving the tool exposed to a potential thief.

The owner of a pick-up truck or SUV can also break so-called "open container" laws in many states by simply transporting of liquor with a broken seal within the vehicle. However, placing the liquor in the bed of the pick-up truck exposes the liquor to the elements. In Northern States the liquor may freeze, and in Southern States be warmed so high to cause the liquor to "cook" spoiling the flavor. However, placing of the liquor within the vehicle may expose the driver to a fine for transporting liquor within a vehicle. Some states have even found placement of liquor in an SUV which does not have a separately accessible trunk to be considered fineable offense.

This is but a few reasons why sport utility vehicles and pick-up trucks require additional storage area and a number of patents have issued in an attempt to address this matter.

DESCRIPTION OF THE PRIOR ART

U.S. Pat. No. 5,823,585 discloses a storage bumper set for a sports truck that can be used on the front or the rear of the truck. This bumper is attached to or in combination with the existing bumper and includes a cover plate that allows access to the interior compartments of the storage bin. Disadvantages of this device include a cover that opens upwardly and can be forced opened by the wind as well as setting forth a storage container that is not esthetically pleasing as it is attached to an existing bumper and physically extends outward from the vehicle.

U.S. Pat. No. 3,614,136 a discloses truck bumper storage device which is similar to the previously mentioned disclosure. The device is attached to the rear of a truck and includes separate closure compartments for sealing various components within each of the separate storage bins. This bumper replaces an existing bumper, making it more esthetically pleasing.

U.S. Pat. No. 4,570,986 discloses yet another rear bumper for a pick-up truck having storage compartments that are sealed by a closure lid. The closure lid being on the top side of the bumper with claims limited to a pair of elongated box structures forming open toped boxes.

U.S. Pat. No. 5,016,932 discloses a bumper with storage compartment that can accessed from the sides of the bumper. An objective of this invention is to provide resistance to moisture penetration by placement of the doors wherein direct rain cannot enter the compartment.

U.S. Pat. No. 5,364,142 disclose a rear storage bumper for a pick-up truck which includes wrap around extensions wherein the bumper looks more like and OEM product.

U.S. Pat. No. 4,674,782 discloses yet another storage bumper having a lid that extends the length of the bumper with support structure so that the entire length of the bumper may be used for storage of long items.

U.S. Pat. No. 4,756,457 discloses a storage apparatus for vans and the like vehicles which attaches to an existing bumper and allows the introduction of large components such as suit cases. This bumper removably attached to the fender.

U.S. Pat. No. 4,901,895 discloses yet another bumper storage compartment which is used primarily for storing of a cover performing either a tent like structure or for encompassing items placed within the truck bed.

U.S. Pat. No. 5,460,420 discloses use of a compartmentized plastic bumper wherein various components of the vehicle such as windshield washer fluid, rear window washer fluid, headlight washer fluid can all be placed within the storage container providing more interior room in the engine compartment.

What is lacking the art is an aerodynamically designed front bumper for a vehicle which has an internal storage capacity wherein the bumper is recessed with conventional protruding items such as radiator, power steering, or the like drive units are accommodated by the shape of the interior portion of the bumper with the exterior portion available for placement of storage items. What is also lacking in the art is a storage bumper assembly which can specially adapted for recreational use.

SUMMARY OF THE INVENTION

It is an objective of the invention to provide a front bumper assembly for a truck or sports utility vehicle which includes insulated, water-tight storage compartments.

It is another objective of the invention to provide a front bumper assembly design having an internal storage capacity which is aerodynamically designed to enhance the vehicle performance.

It is a further objective of the invention to a bumper assembly with storage compartments having hinged lids which have a configuration which forces the lids into a closed position due to the aerodynamic forces of the wind while the vehicle is traveling, with tighter closure caused by higher vehicle speeds.

It is yet a further objective of the invention is to provide a front bumper assembly having internal storage compartments which is formed to extend rearwardly so as to fit around engine accessories, thus providing a bumper that makes use of all available space so as to prevent extrusion from the vehicle beyond acceptable distances.

Still another objective of the instant invention is to provide a front bumper assembly having internal storage compartments which are insulated, thus allowing items to be placed in the compartments to be kept cold or warmed depending upon environmental conditions and the types of components stored.

Still another objective of the instant invention is to provide a heat exchanger disposed in bumper which is coupled to the existing engine system so as to provide a warmed storage area in cold environments.

Yet another objective of the instant invention is to provide a water pump within the bumper which is coupled with a hose and shower head assembly wherein water can be drawn from one of the compartments allowing an individual to rinse off after outdoor activities such as surfing, bicycling, running, swimming, working or the like.

Still another objective of the instant invention is to provide an integrated safe within the bumper which cannot be opened by conventional automobile access means that includes a personalized combination for storage of security items outside the vehicle.

Still another objective of the instant invention is to include a power inverter within the bumper to provide 110 volt electricity for use with construction endeavors or an individual may use a power saw or the like electrical driven device for operation at job sites.

In accordance with the above objectives, an aerodynamic front bumper storage assembly is provided which is adapted for use with trucks, sports utility vehicles and recreational vehicles. The bumper storage assembly includes a bumper shell secured to the frame of the vehicle. The bumper shell is constructed from molded plastic which has a top surface, a front surface, a rear surface, a bottom surface, and opposing left and right surfaces which define an interior cavity. The rear surface is configured to be coextensive with the front end engine components of the vehicle.

The bumper shell includes a center storage compartment and left and right side compartments which are molded into the bumper shell. The storage compartments are defined by bottom walls supported by four side walls and are respectively accessible from the top surface through center, left and right apertures disposed in the top surface. The center aperture and left and right side apertures each have lids hingedly attached to one of the side edges of the apertures. The lids have a front edge and a rear edge each having a length, wherein the length of the rear edge is greater than the length of the front edge forming an air foil shape which forces the lids into a closed position over the apertures when the vehicle is moving.

The left, right and center apertures can have perimeters formed as an inset channels in the top surface. The left, right and center lids have rubber gaskets peripherally attached to the lower surface, wherein the rubber gaskets are configured for mated engagement with the inset channels.

The bumper assembly can include a lockable compartment disposed within the center storage compartment which has a base fixedly attached to the frame of the vehicle. A lid is hingedly attached to the base, and includes a means for locking the lid to the base. The means for locking the lid to the base can comprise a combination lock or a key-operated lock.

In one aspect of the invention, the bumper assembly can include a water pump disposed in the bumper shell which is operatively coupled to the vehicle electrical system. A means is provided for fluidly coupling the water pump to the center storage compartment. A hose is provided having a proximal end coupled to the water pump and a distal end positionable outside of the bumper shell whereby water can be stored in the center storage compartment and pumped through the hose. The distal end of the hose can includes a shower head. A heat exchanger coil can disposed in the center storage compartment which is fluidly coupled to the vehicle engine cooling system.

In another aspect of the invention, the bumper assembly can include an electrical outlet mounted in said bumper shell which is in electrical communication with the vehicle electrical system. The vehicle electrical system is electrically coupled to a power inverter which can be disposed in the bumper shell.

In still another aspect of the invention, the bumper assembly can further comprise an oxygenator pump disposed in the bumper shell which is coupled to the vehicle electrical system. A means for mounting a fishing rod holder assembly on the front surface of the bumper shell can also be provided.

DETAILED DESCRIPTION OF THE INVENTION

Figure 1:
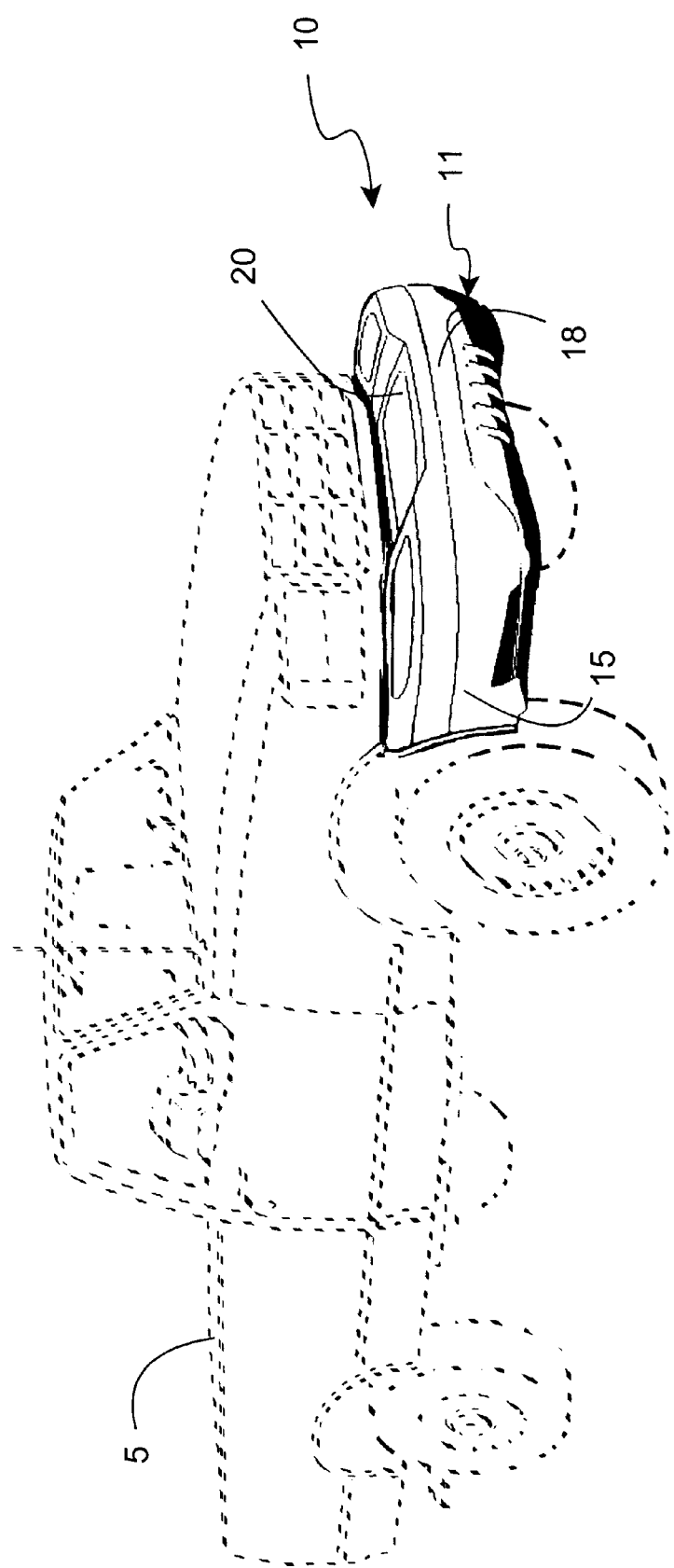
FIG. 1 illustrates a perspective view of a storage bumper assembly according to a preferred embodiment of the invention in which the bumper assembly is installed on a vehicle.
Figure 2:
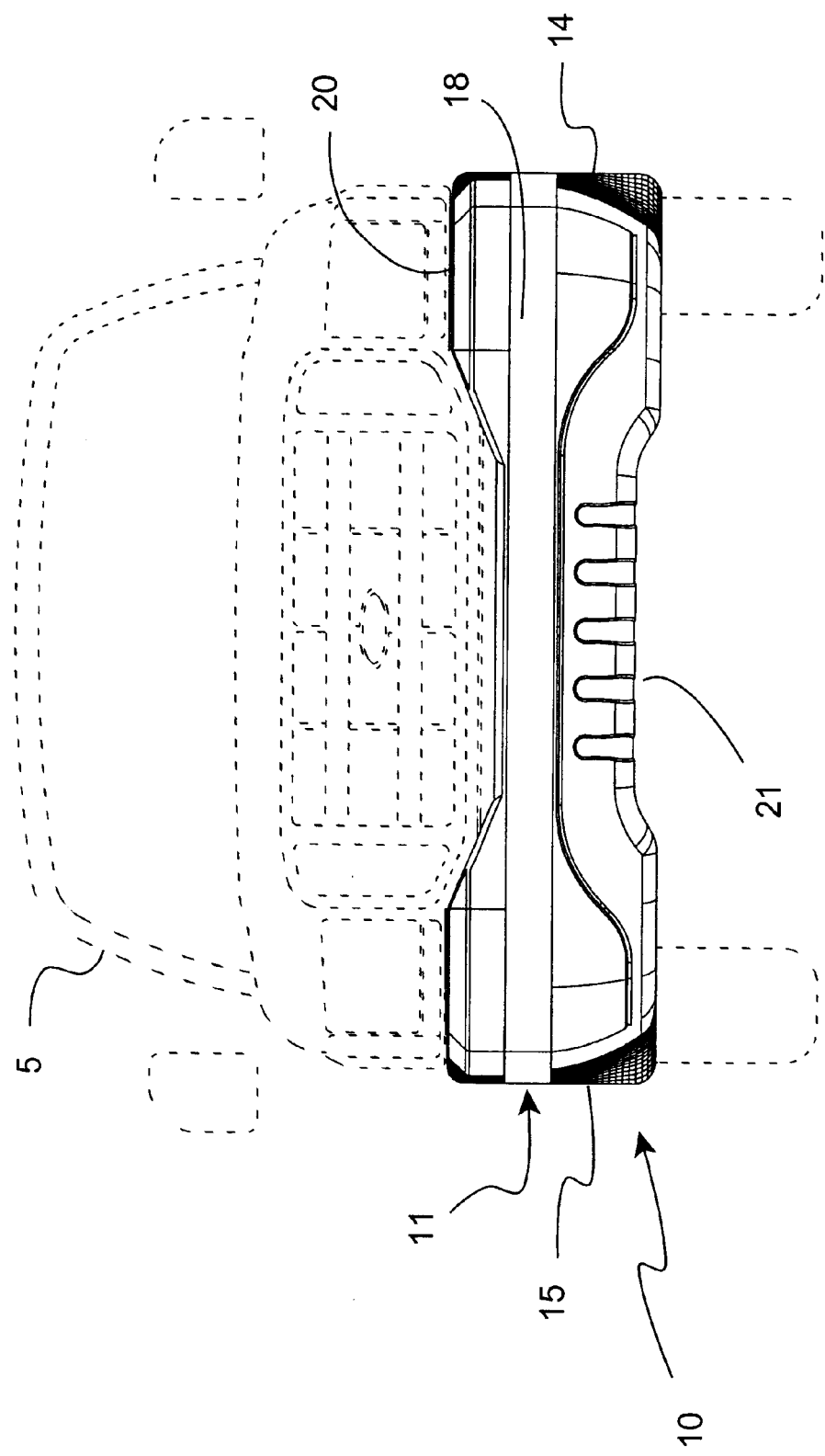
FIG. 2 illustrates a front view of the storage bumper assembly of FIG. 1 installed on a vehicle.

FIGS. 1 and 2 illustrate the storage bumper assembly 10 according to a preferred embodiment of the invention as installed to the front bumper of an automotive vehicle 5. The vehicle 5 is preferably a sports utility vehicle (SUV), pickup truck, van, recreational vehicle, or other similar automotive vehicle, however the storage bumper assembly 10 can be also installed a suitably designed car. The storage bumper assembly 10 can have any suitable functional shape, however in the preferred embodiment the storage bumper assembly 10 is configured to maximize its aerodynamic characteristics.

In the practice of the invention, the original equipment manufacturer (OEM) bumper can be removed and replaced with the bumper assembly 10. The storage bumper assembly 10 provides the normal "bumper" function of the OEM bumper, and provides many additional useful functions, as will be described herein. To create an esthetically pleasing effect, the storage bumper assembly 10 is configured to appear integrally formed with the vehicle body, and to this end, preferably has an exterior color which matches the vehicle paint. The bumper assembly 10 is bolted directly to the frame of the vehicle 5 using any suitable attachment means.

As shown in FIGS. 1–9, the bumper assembly 10 includes a bumper shell 11. The bumper shell 11 is constructed from molded plastic. In the preferred embodiment, the bumper shell 11 is formed from a plastic which has superior strength and impact absorption properties. The bumper shell 11 has a top surface 20, a front surface 12, a left side surface 14, a right side surface 15, a lower surface 21 and a rear surface 22. The bumper shell 11 is typically larger than the OEM bumper, and extends forwardly and extends downwardly a greater distance than the OEM bumper, and unlike the OEM bumper, also extends rearwardly into the engine compartment. In order to maximize the interior storage area, the rear surface 22 is configured to closely fit around the front end engine components. The preferred embodiment of the bumper assembly 10 is custom made for a specific vehicle make and model, and accordingly, will precisely fit around the front end of the vehicle engine. This can be seen in FIG. 6 which illustrates a perspective view of the lower surface 21 of the bumper shell 11 in which it can be seen that the rear surface 22 can be asymmetrical. The precise configuration of the rear surface 22 is dependent on the placement of the engine components in the specific vehicle.

Figure 4A:
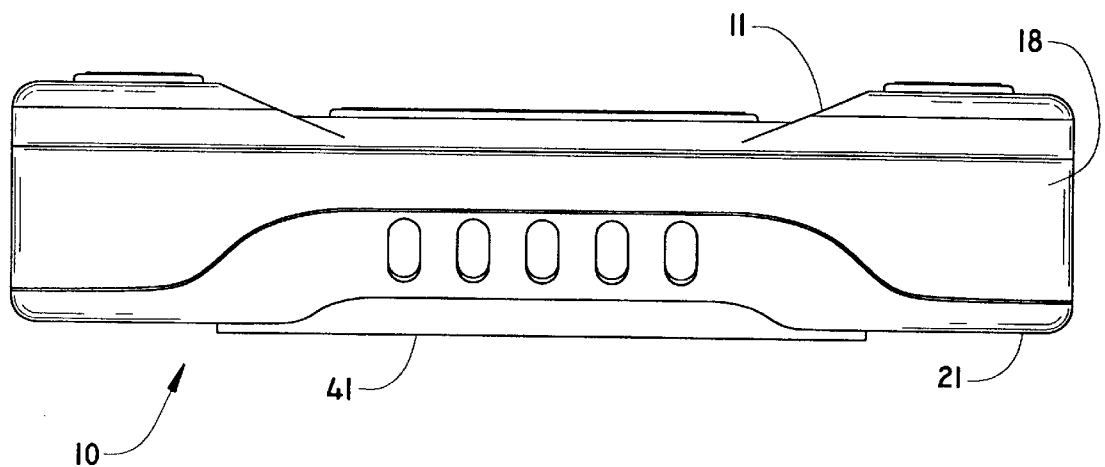
FIG. 4A is a front elevational view of the bumper assembly of FIG. 1 showing the position of the air foil.
Figure 4B:
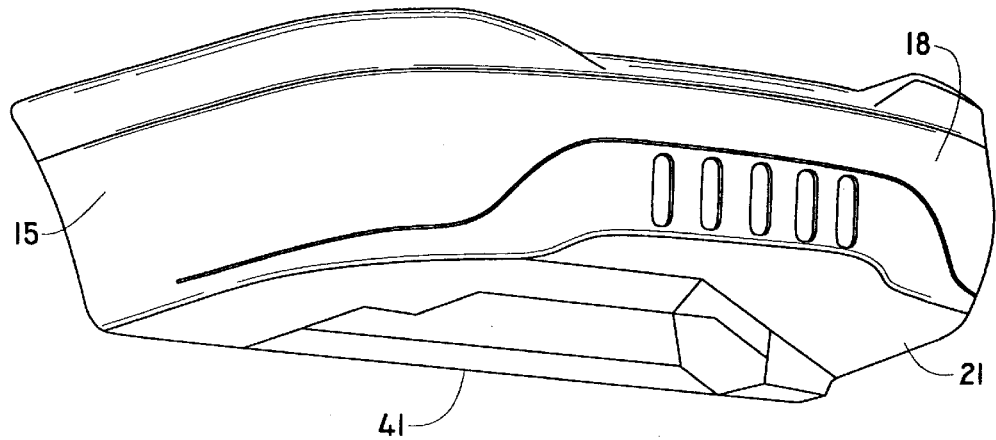
FIG. 4B is a perspective view of the bumper assembly of FIG. 1 taken from the bottom right showing the position of the air foil.
Figure 5:
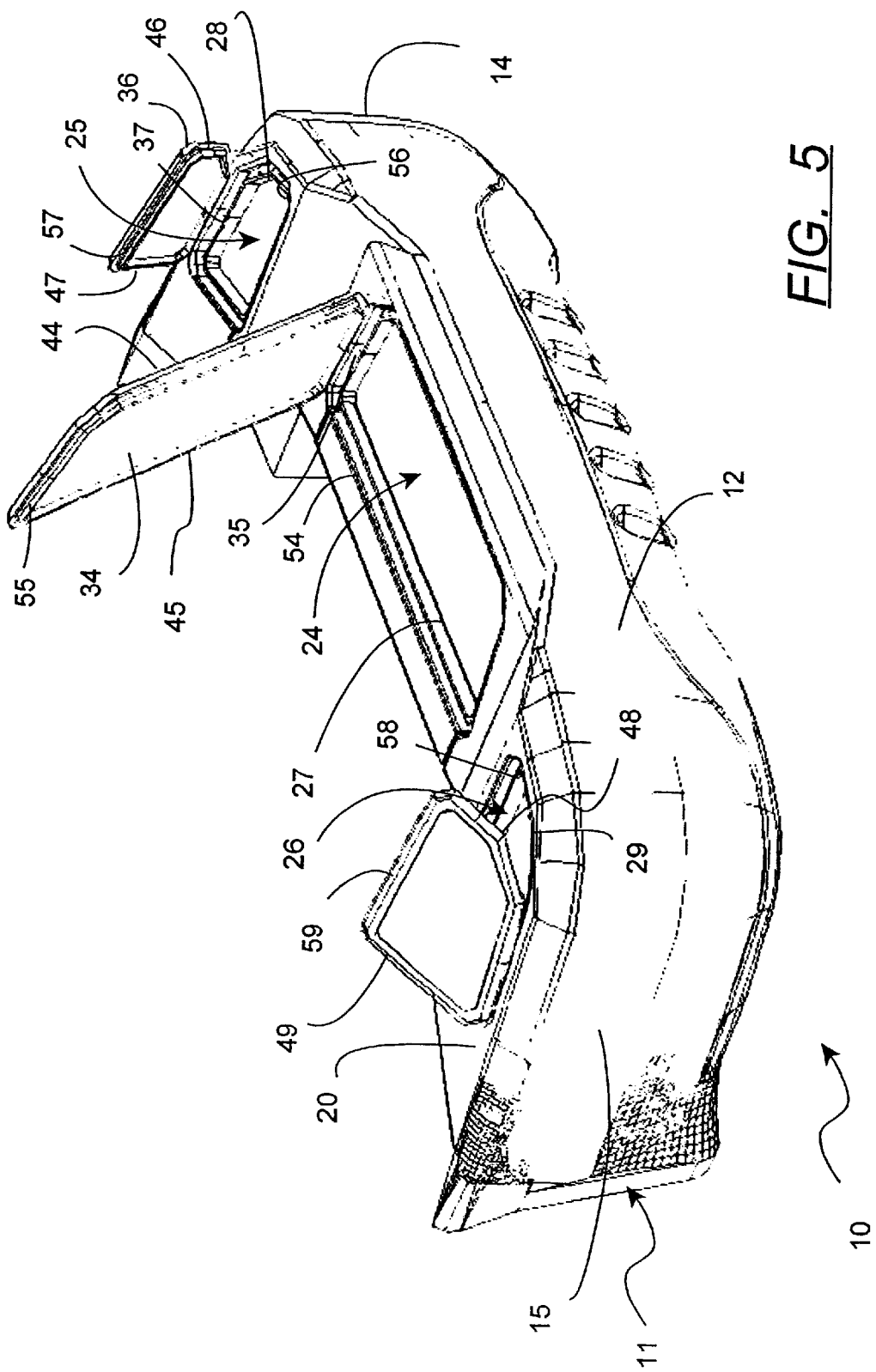
FIG. 5 is a perspective view of the bumper assembly of FIG. 1 taken from the top right in which the compartment lids are shown in an open configuration.
Figure 6:
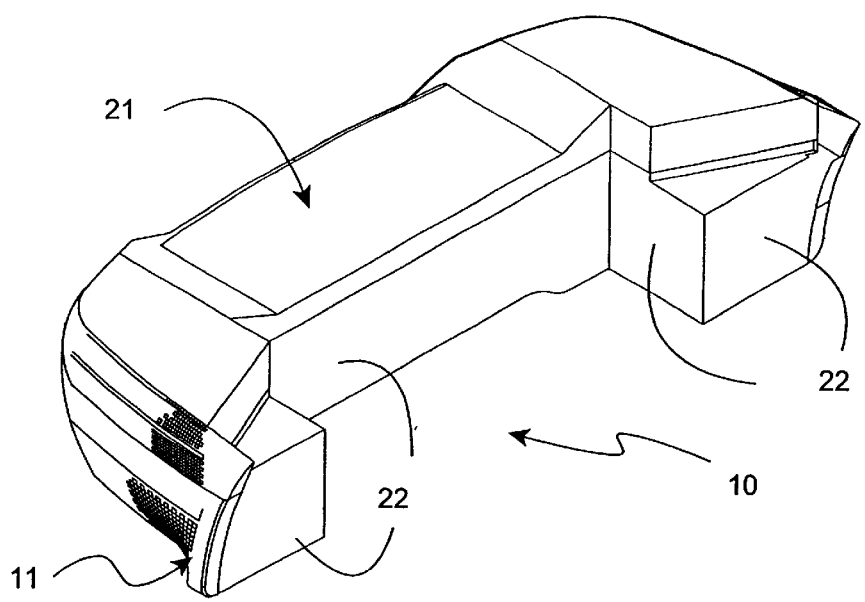
FIG. 6 is a perspective view of the lower surface bumper assembly of FIG. 1 taken from the bottom right showing configuration of the rear surface.
Figure 7:
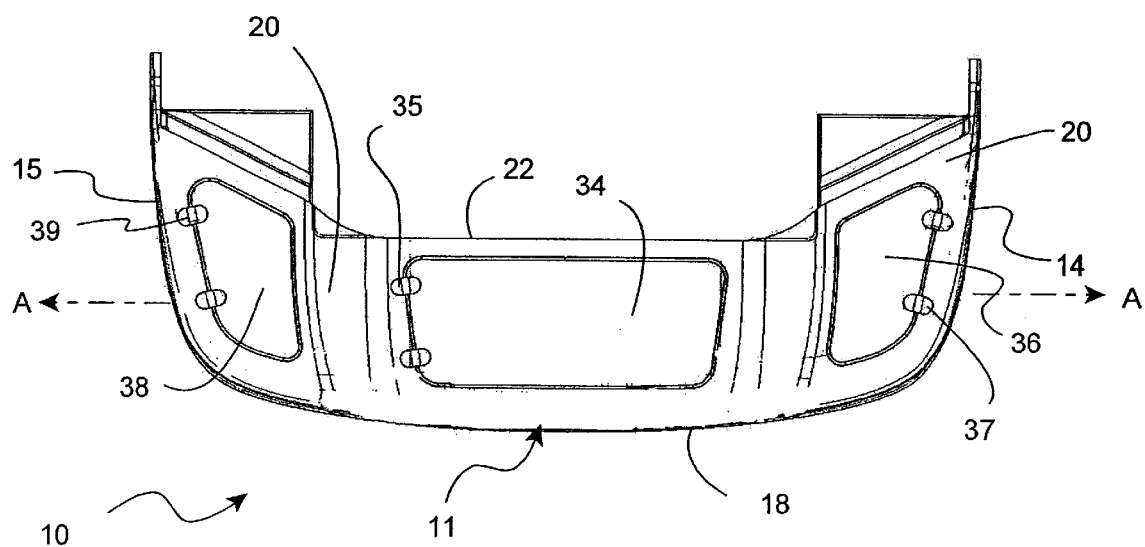
FIG. 7 is a top plan view of the bumper assembly of FIG. 1.

In addition to its functional aspects to be described hereafter, the bumper assembly 10 is configured to optimize its aerodynamic characteristics. The configuration of the bumper shell 11 advantageously diverts air flowing under the vehicle to the vehicle's existing front mounted radiator and transmission/oil coolers. As seen in FIGS. 4A and 4B, an air foil 41 is mounted on the lower surface 21 and extends downwardly from the bumper shell 11. When installed, the bumper shell 11 hangs approximately 2 inches lower that a typical OEM bumper, and advantageously reaches lower (and therefore cooler) air that the OEM air dam, which prevents turbulent air from going below the vehicle's body and causing lift and turbulence in the airflow. The inventors have found that in application, this effect provided by the bumper shell 11 improves engine and vehicle cooling while reducing drag and lift aerodynamically. The installation of the bumper assembly 10 on a vehicle therefore provides the potential for improved mileage and overall performance.

The bumper shell 11 has a plurality of water-tight storage compartments which can be configured as box-like containers depending from the top surface 20. This configuration advantageously creates double-walled, insulated compartments. The position of the interior walls of the compartments can be most clearly seen in FIGS. 8 and 9. Insulation material 51 can be disposed within the bumper shell 11. Suitable insulation materials would include a flexible polyolefin, such as polyethylene or a foamed polyurethane, or a close cell polythene foam, such as polycarbonate. In the preferred embodiment, the storage bumper assembly 10 includes a center compartment 24, a left side compartment 25, and a right side compartment 26. The compartments can include lighting fixtures mounted therein which are coupled to the vehicle electrical system.

The center compartment 24 is elongated, and is preferably sufficiently insulated so that the center compartment 24 can be used as an ice chest or thermal container. The center compartment 24 is accessed through a center aperture 27 in the top surface 20. The center aperture 27 has a generally trapezoidal configuration with front and rear edges 128a,b and side edges 127a,b. The rear edge 128b has a length greater than front edge 128a such that side edges 127a,b are outwardly divergent from one another. A center lid 34 configured for mated engagement with center aperture 27 is hingedly attached to one of side edges 127a,b. The center aperture 27 has a perimeter which can be formed as an inset channel 54. The center lid 34 has a lower surface 34b which includes a peripherally attached rubber gasket 55 which is configured for mated engagement with the inset channel 54.

The left compartment 25 and right compartment 26 are positioned on either side of center compartment 24. The left and right compartments 25 and 26 are preferably symmetrically configured. The left compartment 25 is accessed through a left aperture 28 in the top surface 20. The left aperture 28 has an asymmetrical configuration with front and rear edges 131a,b and left and right side edges 120a,b. The rear edge 128b has a length greater than front edge 128a. A left lid 36 configured for mated engagement with left aperture 29 is hingedly attached to the right side edge 130b. The left aperture 27 has a perimeter which can be formed as an inset channel 56. The left lid 36 has a lower surface 36b which includes a peripherally attached rubber gasket 55 which is configured for mated engagement with the inset channel 54. The right compartment 26 similarly includes right aperture 29, right lid 38, right inset channel 58 and right aperture gasket 59.

Figure 3:
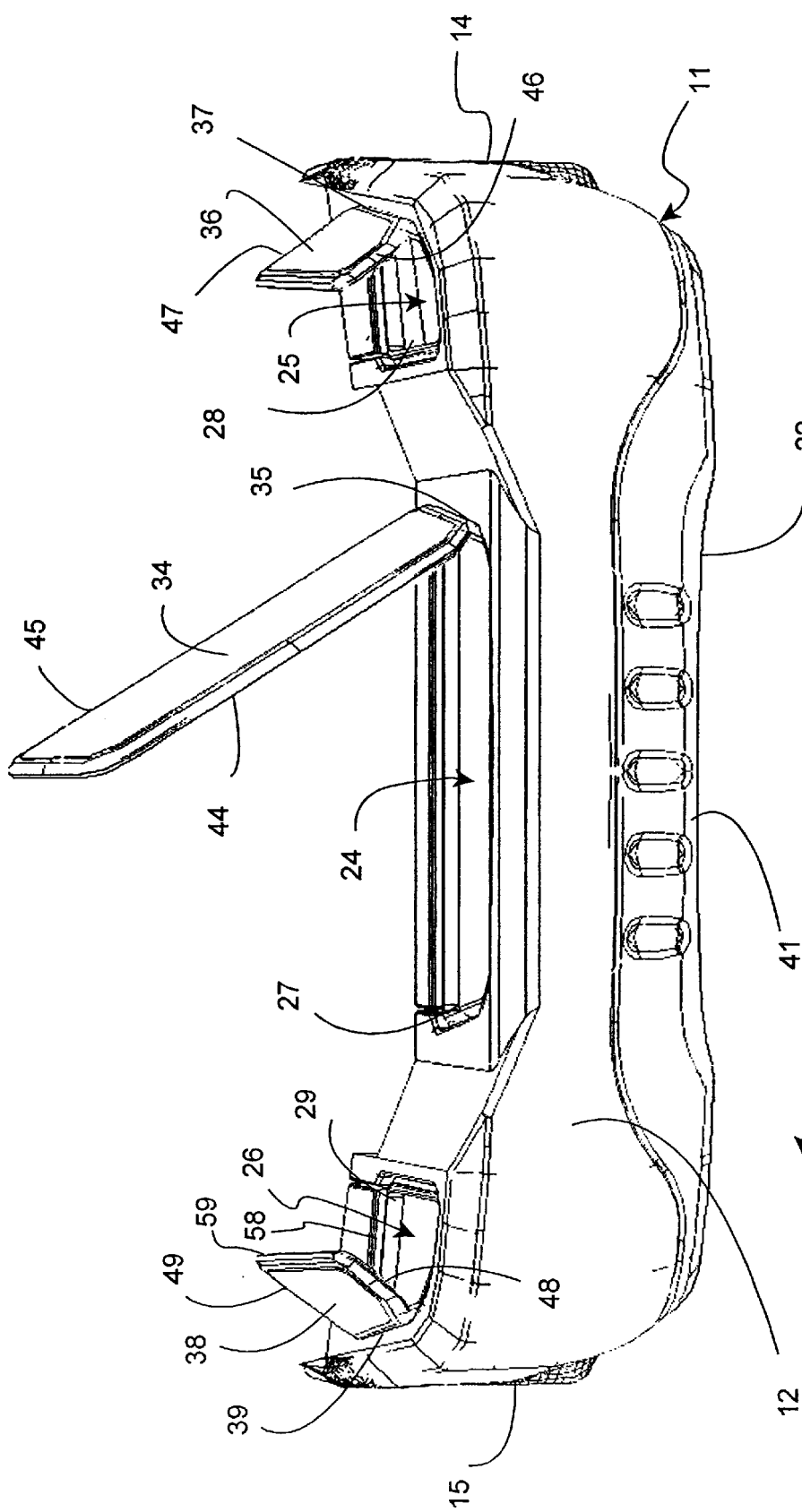
FIG. 3 is a front elevational view of the bumper assembly of FIG. 1 in which the compartment lids are shown in an open configuration.
Figure 8:
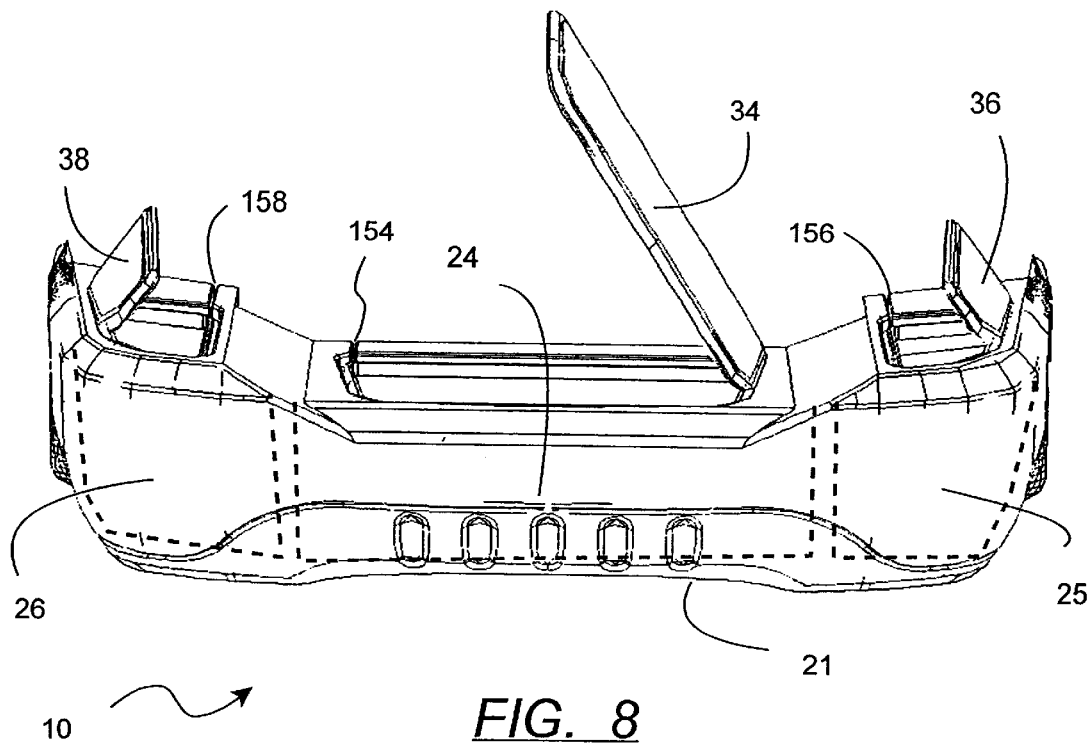
FIG. 8 is a front view of the bumper assembly of FIG. 1 in which the interior walls of the inner compartments are shown in phantom.
Figure 9:
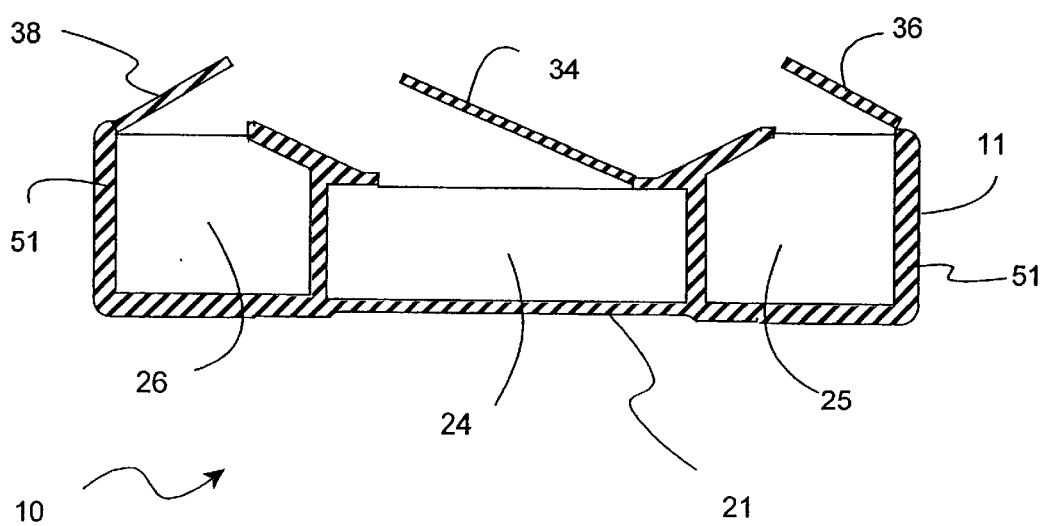
FIG. 9 is a cross-sectional view taken along the line A—A of FIG. 7.

The shape of the lids and the side-hinging arrangement described above is a key aspect of the present invention. In an open position, the lids present a wing-like shape to the oncoming wind when the vehicle is in motion. This effect is best illustrated in FIGS. 3 and 8. This wing-like shaped utilizes the forward motion of the vehicle to close and lock the lids should they inadvertently be left open. For the center lid 34, the trapezoidal configuration of the lid 34 and the location of the hinges on the side edges of the aperture 27 advantageously creates an air foil when the center lid is in an open position. In an open position, the top surface 34a of center lid 34 is positioned at an oblique angle to the horizontal such that forward motion of the vehicle forces the lid into a closed position over the center aperture when vehicle is moving. The asymmetrical shapes of the left lid 36 and the right lid 38 and the position of the hinge at the outer side edges also creates an air foil effect when the lids are in an open position so that the lids are shut by onrushing air. Another advantage of the aerodynamic design of the lids is that they are held more tightly in place by the air flow at higher speeds. The compartments and lids can also be provided with push-down type latches which automatically latch when the vehicle is moving at a sufficient speed.

In the preferred embodiment, the inset channels 54, 56, 58 intersect with rearwardly extending drainage channels 154, 156 and 158 (FIG. 8). The forward motion of the vehicle causes water to be routed back away from the compartments.

Figure 10A:
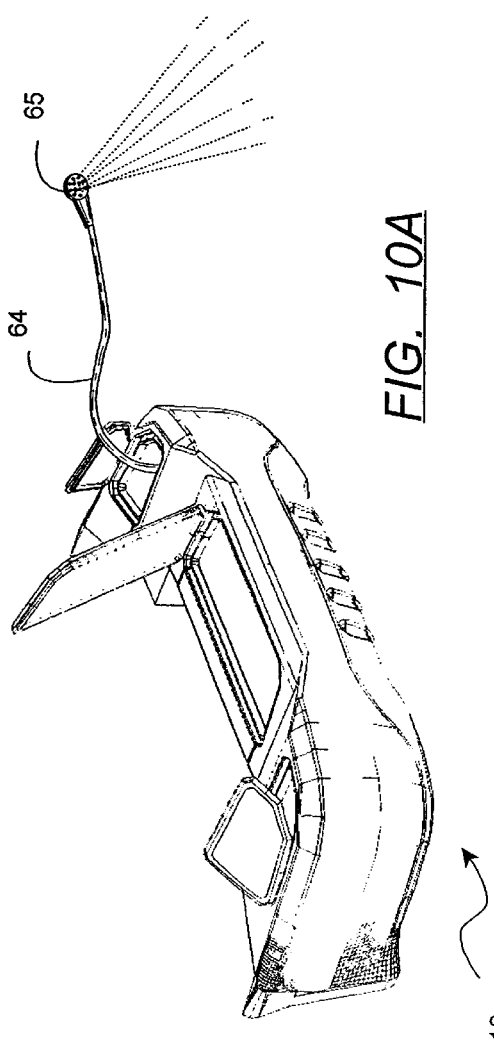
FIG. 10A illustrates a perspective view of the bumper assembly of FIG. 1 in an embodiment which provides a mobile shower facility.
Figure 10B:
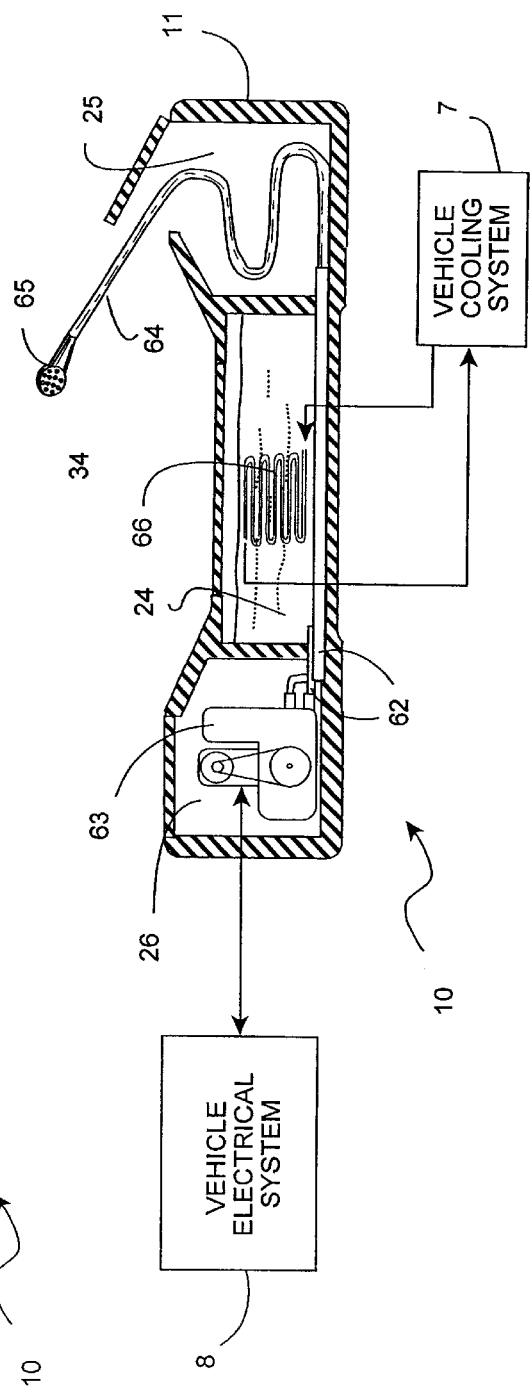
FIG. 10B illustrates a cross-sectional view of the bumper assembly of FIG. 1 in an embodiment which provides a mobile shower facility.

The integrally formed compartments in the bumper assembly 10 of the invention advantageously provides auxiliary storage space for the vehicle. In addition, the structure of the compartments also allows the bumper assembly 10 to perform a variety of useful functions. The bumper assembly 11 can also be adapted for specialized recreational applications with very little modification of the basic structure. In one aspect of the invention as shown in FIGS. 10A and 10B, a water pump 63 can be disposed in either the left or right side compartments 25, 26. The water pump can be electrically coupled to the vehicle electrical system 8. The water pump 63 is fluidly coupled to the center compartment 24 using any suitable means, such as conduits 62. This arrangement allows water to be stored in the center compartment 24 and pumped out using water pump 63 through a hose 64 which has a proximal end coupled to the water pump 63 and a distal end positionable outside of the bumper shell 11. A shower head unit 65 can be attached to the distal end of the hose 64. In this way, the bumper assembly 10 can enable a user to have ready access to a portable shower facility at any desired location, such as the beach, work site, camp site etc.

Hot water can be provided by means of a heat exchanger 66 mounted in the center compartment 24. The heat exchanger 66 is coupled to the vehicle cooling system 7. Warm engine coolant is routed through the heat exchanger 66 to heat the water in the center compartment 24. This action also augments the vehicle cooling system 7 by helping to cool the vehicle engine. The heat exchanger 66 can be coupled to a thermocouple which can manually selectively set to the desired temperature.

The heat exchanger 66 can also be utilized when the center compartment 24 is dry. In this way, items stored in the center compartment 24 can be kept warm. This is highly desirable in colder climates to keep stored items from freezing such as oil, water and emergency items. It can also be used to maintain the temperature of hot food items which may be stored in the center compartment 24.

Figure 11:
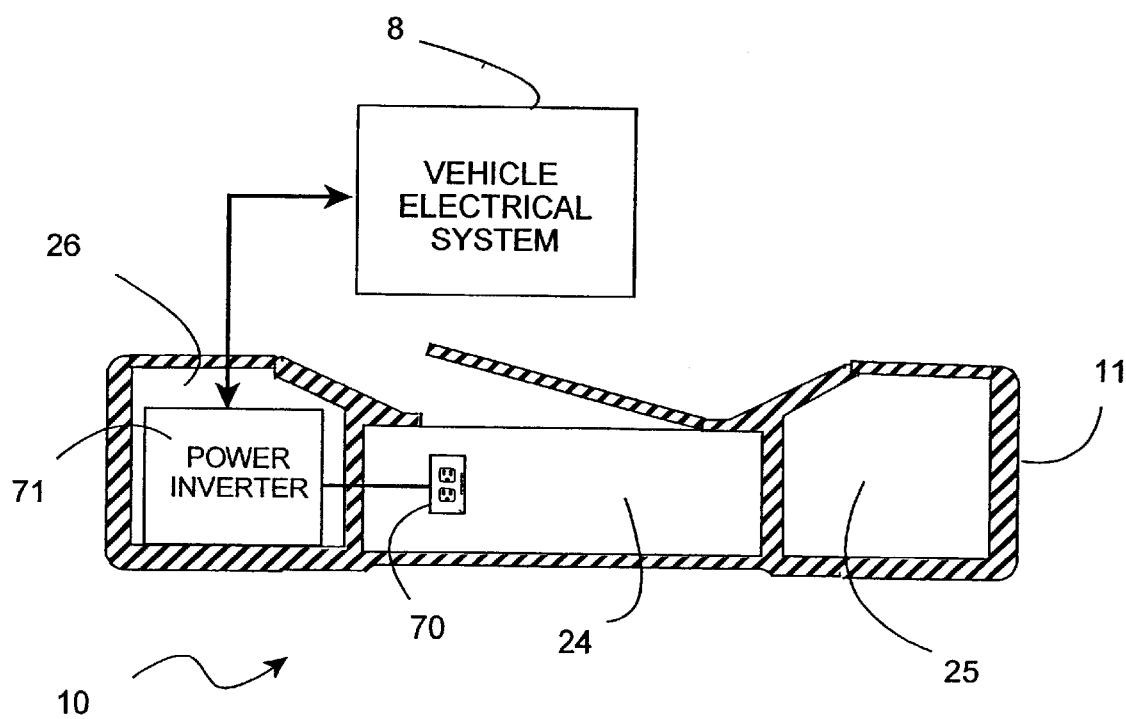
FIG. 11 illustrates a cross-sectional view of the bumper assembly of FIG. 1 in an embodiment which provides a an electrical outlet.

In another aspect of the invention illustrated in FIG. 11, a power inverter 71 can be disposed in one of the compartments which is electrically coupled to the vehicle electrical system 8. The power inverter 71 is coupled to at least one weatherproof electrical outlet 70 installed in the bumper shell 11. The outlet 70 can be installed in any desired location, either on the outside surface of the bumper shell 11 or inside one of the compartments. This arrangement allows the operation standard 110V household electronic items.

Figure 12A:
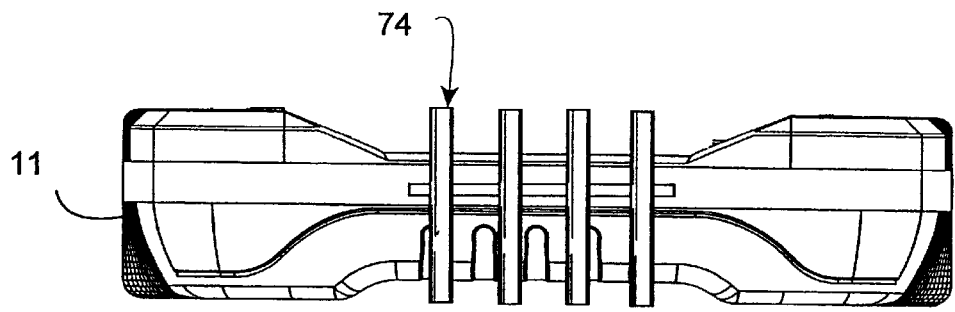
FIG. 12A illustrates a perspective view of the bumper assembly of FIG. 1 in an embodiment adapted for use in recreational fishing.
Figure 12B:
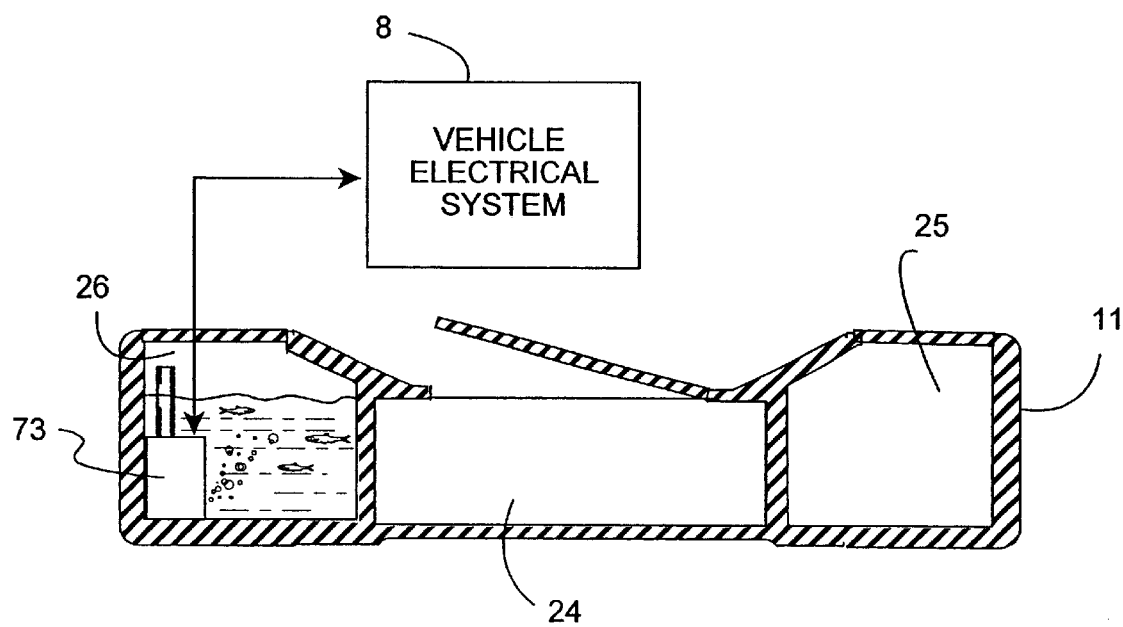
FIG. 12B illustrates a cross-sectional view of the bumper assembly of FIG. 1 in an embodiment adapted for use in recreational fishing.

The bumper assembly can 10 also be adapted to provide a specialized vehicle for recreational fishing as shown in FIGS. 12A and 12B. In this embodiment, one of the left or right side compartments 25, 26 can include an oxygenator pump 73 which is coupled to the vehicle electrical system 8 (FIG. 12B). As illustrated in FIG. 12B, this arrangement allows the left side compartment 25 to be used as a live bait well. The right side compartment 26 can be used for tackle storage, and the center compartment 24 can be used as a ice chest. As shown in FIG. 12A, a fishing rod holder assembly 74 can be attached to the front surface 18 of the bumper shell 11.

Figure 13:
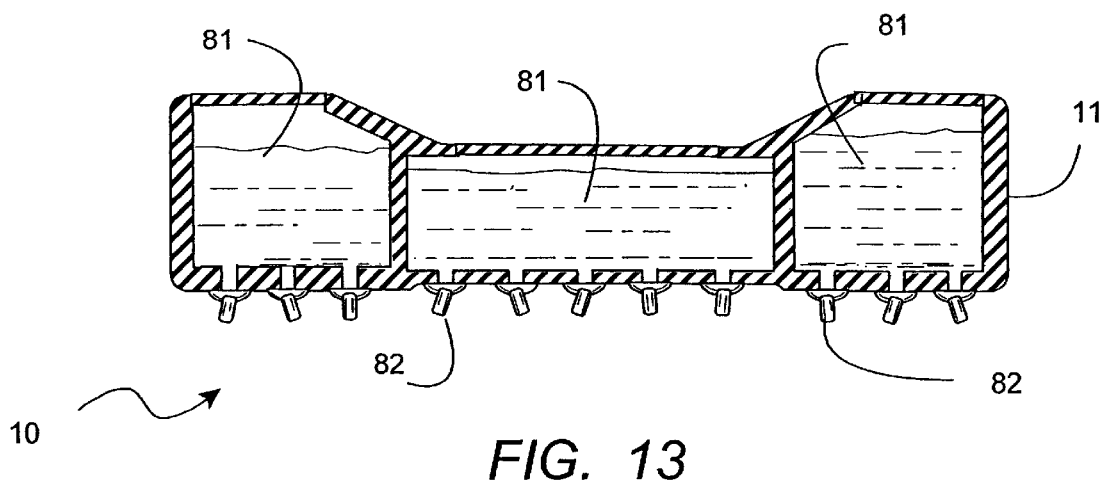
FIG. 13 illustrates the bumper assembly of FIG. 1 in an embodiment adapted for use in free range calve feeding.

The bumper assembly 10 can also be adapted for any number of highly specialized situations, both industrial and recreational. One such application is a unique solution to the problem of feeding of free-range calves. An embodiment of the bumper assembly 10 adapted for this circumstance is illustrated in FIG. 13. In this embodiment, calf formula 81 is stored in the compartments. A plurality of swiveling calf nipples 82 are installed in the lower surface 21 so as to be accessible by the calves as they approach the vehicle. This arrangement advantageously allows many calves to be feed simultaneously.

Figure 14:
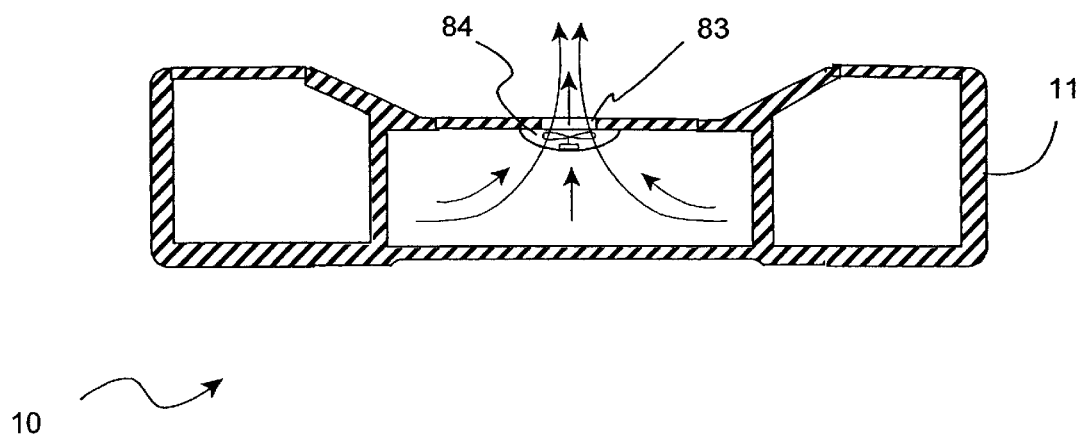
FIG. 14 illustrates a cross-sectional view of the bumper assembly of FIG. 1 in an embodiment which includes ventilation fans installed in the center compartment.

In some situations, it may be desired to store wet items in the storage compartments such as swimsuits, scuba gear, etc. In order to effectively aerate the compartments to prevent mildew, the left lid 36, center lid 34 and right lid 38 can include vent openings. As shown in FIG. 14, the center lid 34 can have an aperture 83 to provide ventilation. The aperture 83 can be covered with a suitable screening material. A battery-operated ventilation fan 84 can be mounted under the aperture 83 to speed moisture removal from the center compartment 24.

Figure 15:
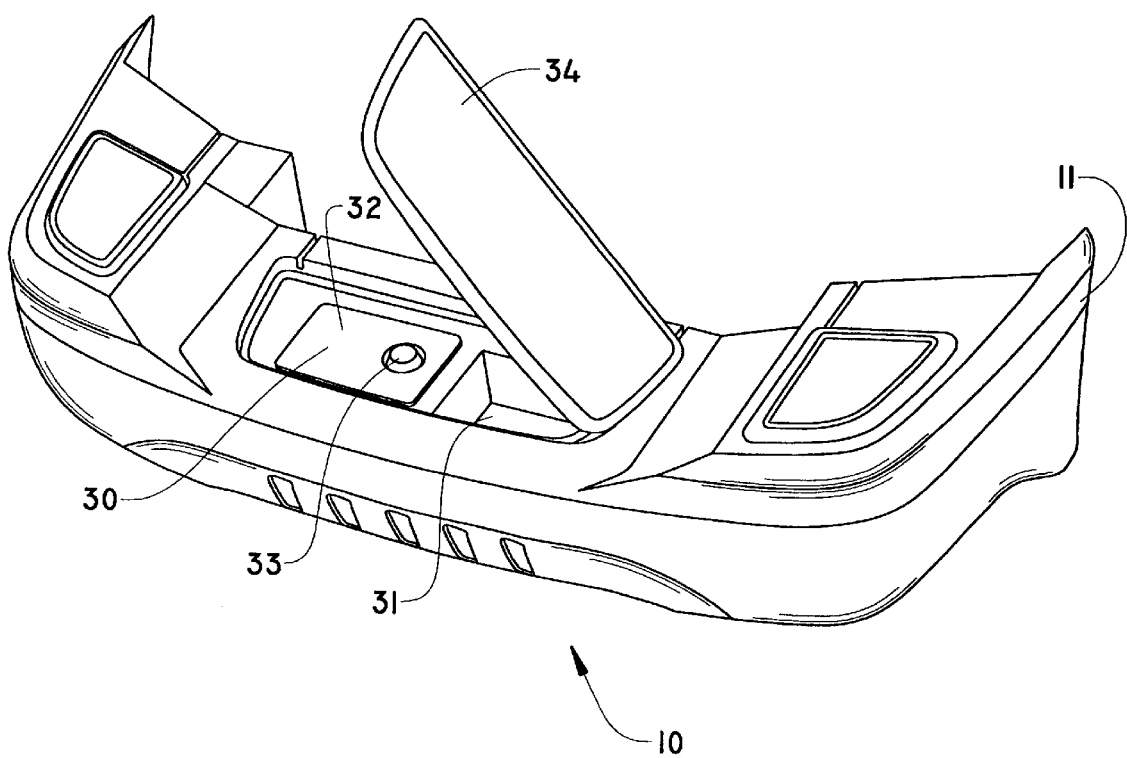
FIG. 15 illustrates a perspective view the bumper assembly of FIG. 1 in which a safe is installed in the center compartment.

To provided added security for valuable items, the bumper assembly 10 can include an integral safe box within the compartments. As shown in FIG. 15, a reinforced safe box 30 can be installed within the center compartment 24. The safe box 30 is preferably bolted directly to the frame of the vehicle 6 for added security. The safe box has a base 31 and a hingedly attached lid 32. The safe box 30 can use any suitable locking means, such as the a combination lock 33 as shown, or can have a key lock.

Figure 16:
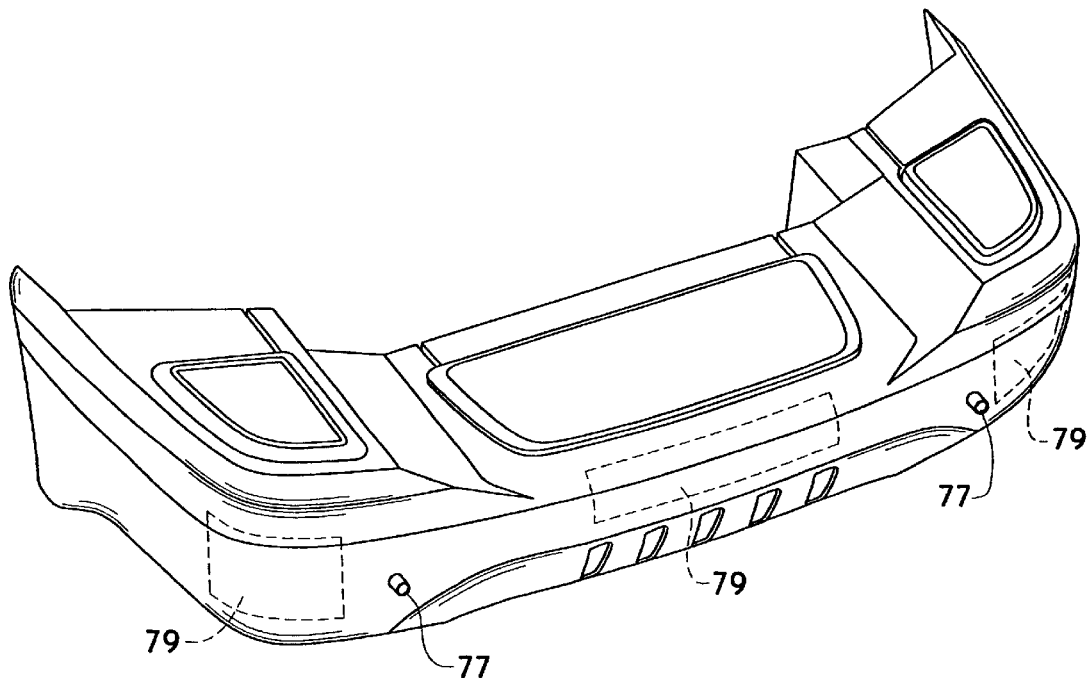
FIG. 16 illustrates a perspective view of the bumper assembly of FIG. 1 with a distance sensors and air bags therein.

Referring now to FIG. 16, the front surface 12 of bumper assembly 11 can also include a plurality of distance sensors 77 as are presently commonly used on the back of SUV's. As is well known in the art, the distance sensors 77 sense when a imminent impact is detected, e.g. an obstacle 10 feet away approaching at 40 mph. The sensors 77 are operable to provide an audible warning signal to the driver. The bumper assembly 10 can also include air bags 79 installed therein which are electrically coupled to the sensors 77. The sensors 77 can be operable to trigger the inflation of the air bags 79 when an impact is imminent. This feature is highly advantageous as it protects both the vehicle itself and the object, person, or animal in danger of being hit by the vehicle.

Figure 17:
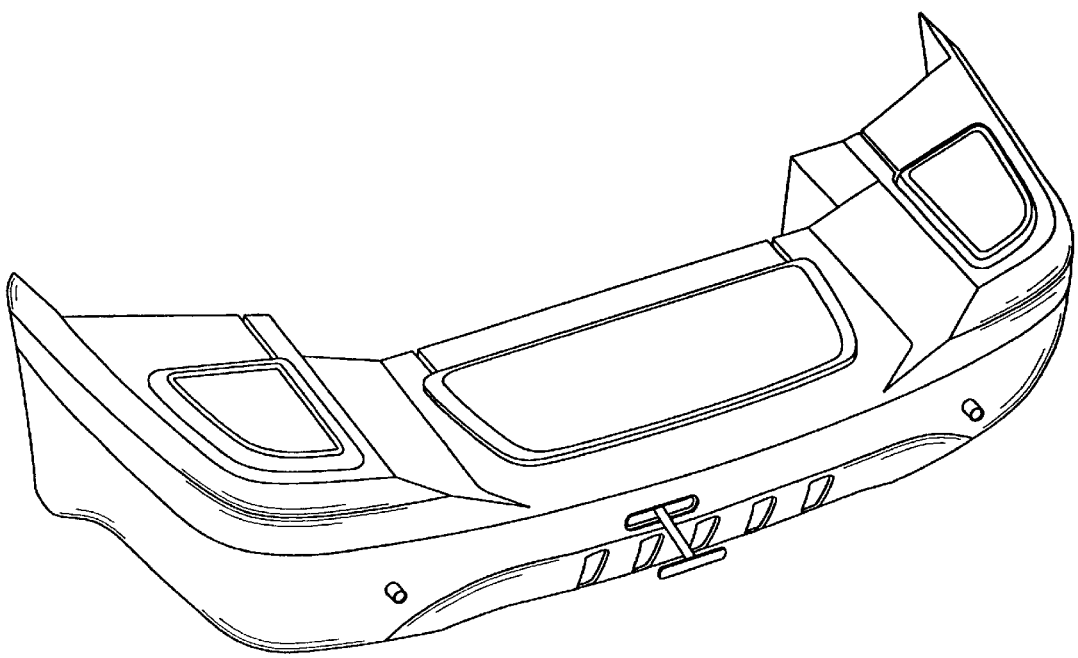
FIG. 17 illustrates a perspective view the bumper assembly of FIG. 1 with a flush-mounted cleat installed therein.

Any variety of useful hardware accessories can be installed into the bumper shell 11. An example is shown in FIG. 17 in which a flush mounted cleat 86 can be installed in the front surface 18. The cleat 86 attached to the vehicle frame. The cleat 86 is flush with the front surface 18 in a closed position, and is manually extendable to a open position.

In addition to the embodiments described above, the invention contemplates any number of specialized adaptions to the basic structure of the bumper assembly 10, and the invention is not limited in this regard.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. An aerodynamic front bumper storage assembly adapted for use with a vehicle, comprising:

a bumper shell constructed from molded plastic having a top surface, a front surface, a rear surface, a lower surface, and opposing left and right surfaces defining an interior cavity including engine component cavities configured coextensive with front end engine components of the vehicle, said bumper shell secured to a frame of the vehicle;

a center storage compartment molded into said bumper shell, said center storage compartment defined by a bottom wall supported by four side walls accessible from said top surface through a center aperture disposed in said top surface having opposing side edges, said aperture having a center lid hingedly attached to one of said side edges of said aperture, said center lid having a front edge and a rear edge each having a length, wherein the length of said rear edge is greater than the length of said front edge forming an air foil shape which forces said center lid into a closed position over said center aperture when said vehicle is moving;

a left side storage compartment molded into said bumper shell defined by a bottom wall supported by four side walls accessible through a left side aperture disposed in said top surface having opposing side edges, said left side aperture having a left lid hingedly attached to one of said side edges of said left side aperture, said left lid having a front edge and a rear edge each having a length, wherein the length of said rear edge is greater than the length of said front edge forming an air foil shape which forces said left lid into a closed position over said left side aperture when said vehicle is moving; and a right side storage compartment molded into said bumper shell defined by a bottom wall supported by four side walls accessible through a right side aperture disposed in said top surface having opposing side edges, said right side aperture having a right lid hingedly attached to one of said side edges of said right side aperture, said right lid having a front edge and a rear edge each having a length, wherein the length of said rear edge is greater than the length of said front edge forming an air foil shape which forces said right lid into a closed position over said right side aperture when said vehicle is moving.

2. The bumper assembly of claim 1, further comprising a heat exchanger coil disposed in said center storage compartment, wherein said heat exchanger is fluidly coupled to a vehicle engine cooling system.

3. The bumper assembly of claim 1, further comprising:

a water pump disposed inside said bumper shell, wherein said water pump is operatively coupled to a vehicle electrical system;

means for fluidly coupling said water pump to said center storage compartment; and a hose having a proximal end coupled to said water pump and a distal end positionable outside of said bumper whereby water can be stored in said center storage compartment and pumped through said hose.

4. The bumper assembly of claim 3, wherein said hose has a distal end further comprising a shower head unit attached to the distal end of said hose.

5. The bumper assembly of claim 1, further comprising a lockable compartment disposed within said center storage compartment wherein said lockable compartment has a base fixedly attached to the frame of the vehicle, a lid hingedly attached to said base and a means for locking said lid to said base.

6. The bumper assembly of claim 5, wherein said means for locking said lid to said base lockable compartment comprises a combination lock.

7. The bumper assembly of claim 5, wherein said means for locking said lid to said base comprises a key-operated lock.

8. The bumper assembly of claim 1, further including an electrical outlet mounted in said bumper shell, wherein said outlet is in electrical communication with a vehicle electrical system.

9. The bumper assembly of claim 1, further comprising:

a power inverter disposed in said bumper shell, wherein said power inverter is electrically coupled to a vehicle electrical system; and an electrical outlet mounted in said bumper shell, said electrical outlet in electrical communication with said power inverter.

10. The bumper assembly of claim 1, further comprising an oxygenator pump disposed in said bumper shells, wherein said oxygenator pump is coupled to a vehicle electrical system.

11. The bumper assembly of claim 1, further including a means for mounting a fishing rod holder assembly to said front surface of said bumper.

12. The front bumper assembly of claim 1, wherein said center aperture has a perimeter formed as an inset channel in said top surface, and said center lid has a lower surface wherein a rubber gasket peripherally attached to said lower surface, wherein said rubber gasket is configured for mated engagement with said inset channel.

13. The front bumper assembly of claim 1, wherein said left side aperture has a perimeter formed as an inset channel in said top surface, and said left side lid has a lower surface wherein a rubber gasket peripherally attached to said lower surface, wherein said rubber gasket is configured for mated engagement with said inset channel.

14. The front bumper assembly of claim 1, wherein said right side aperture has a perimeter formed as an inset channel in said top surface, and said right side lid has a lower surface wherein a rubber gasket peripherally attached to said lower surface, wherein said rubber gasket is configured for mated engagement with said inset channel.

15. The front bumper assembly of claim 1, wherein said lower surface of said bumper shell includes an air foil, wherein said air foil directs air into a vehicle radiator.

16. The front bumper assembly of claim 1, wherein said front surface of said bumper shell further comprises distance sensors installed therein operable to detect an imminent impact and provide an alarm signal when such is detected.

17. The front bumper assembly of claim 16, wherein said bumper shell further comprises air bags installed therein wherein said air bags are ejectable through said front surface, wherein said ejection is triggered by said alarm provided by said distance sensors.

* * * * *